United States Patent [19]

Doelves

[11] Patent Number: 4,729,037

[45] Date of Patent: Mar. 1, 1988

[54] METHOD FOR RECORDING PRINTING FORMS

[75] Inventor: Juergen Doelves, Heikendorf, Fed. Rep. of Germany

[73] Assignee: Dr. Ing. Rudolf Hell GmbH, Fed. Rep. of Germany

[21] Appl. No.: 44,015

[22] Filed: Apr. 29, 1987

[30] Foreign Application Priority Data

Apr. 30, 1986 [EP] European Pat. Off. ......... 86105990.5

[51] Int. Cl.[4] .................... H04N 1/40; H04N 1/21; H04N 1/23
[52] U.S. Cl. .................... 358/299; 358/280; 358/284; 358/296
[58] Field of Search ............ 358/280, 283, 284, 296, 358/298, 299

[56] References Cited

U.S. PATENT DOCUMENTS

| | | | |
|---|---|---|---|
| 3,904,816 | 9/1975 | Taudt et al. | 178/6 |
| 4,013,829 | 3/1977 | Baar et al. | 358/299 |
| 4,034,400 | 7/1977 | Owen et al. | 358/75 |
| 4,135,212 | 1/1979 | Pugsley et al. | 358/256 |
| 4,231,069 | 10/1980 | Wellendorf et al. | 358/283 |
| 4,255,761 | 3/1981 | Knop et al. | 358/80 |
| 4,403,249 | 9/1983 | Knop et al. | 358/80 |
| 4,439,790 | 3/1984 | Yoshida | 358/296 X |
| 4,484,232 | 11/1984 | Gast | 358/299 |
| 4,496,989 | 1/1985 | Hirosawa | 358/296 |
| 4,513,325 | 4/1985 | Itoh | 358/296 X |
| 4,551,769 | 11/1985 | Satoh | 358/296 |
| 4,553,172 | 11/1985 | Yamada et al. | 358/280 |

FOREIGN PATENT DOCUMENTS

2130838A 6/1984 United Kingdom .

*Primary Examiner*—E. A. Goldberg
*Assistant Examiner*—Patrick W. Foster
*Attorney, Agent, or Firm*—Hill, Van Santen, Steadman & Simpson

[57] ABSTRACT

In a picture-element-by-picture-element and picture-line-by-picture-line recording of printing forms, at least two picture signal sequences are acquired, and the picture signal sequences are influenced by mask signals. A recording signal sequence for the control of a recording element for the printing form is generated with the assistance of the influenced picture signal sequences. A signal sequence is acquired from every picture signal sequence, this signal sequence containing the picture signal values of the corresponding picture sequence to be recorded for picture elements lying within a sub-area of the printing form to be recorded and in which the picture signal values of the corresponding picture signal sequence which are not to be recorded for picture elements lying outside of the sub-area are respectively replaced by a mask signal value. The signal sequences are combined to form a resulting signal sequence. The possible signal value combinations of the resulting signal sequence have recording signal values allocated to them, which, during recording of the printing form, are called in by the respective signal value combinations as a recording signal sequence.

33 Claims, 12 Drawing Figures

METHOD FOR RECORDING PRINTING FORMS

BACKGROUND OF THE INVENTION

1. Field of the Invention

The present invention is directed to the field of electronic reproduction technology and is directed to a method and to an apparatus for picture-element-by-picture-element and picture-line-by-picture-line recording of printing forms, particularly for multi-color printing, wherein the recording signal required for the control of the recording element is called in from a signal source.

2. Description of the Prior Art

Before the printing form recording, individual originals for images and texts from which printed pages are to be compiled are first opto-electronically and tri-chromatically scanned in a color scanner in order to acquire color signals. In the case of four-color printing, a color correction computer corrects the color signals into color separation signals for the color separations "yellow", "magenta", "cyan", and "black". The color separation signals specify the required dosings of the inks for printing. The color separation signals of the individual originals are digitized into color separation data and are intermediately stored. Based on a lay-out plan, images and texts are then assembled in an electronic image processing system to form the individual printed pages and the color separation data of all printed pages of a printing order are first deposited in a data source for further employment in the sequence required for recording.

These work steps generally ensue long before the printing form recording, the color separation data being read out from the data source therein and being employed for controlling the recording element of a recording equipment.

In the case of printing form recording for offset printing, the recording equipment is a black/white recorder with which the rastered color separations of the printed pages are exposed on a film material or directly on printing plates. In printing form recording for rotogravure printing the recording means, by contrast, is an engraving system with which the rastered color separations of the printed pages are engraved on printing cylinders.

The problem to be solved shall be set forth with reference to the example of printing form recording for a merchandising catalog. A merchandising catalog comprises a plurality of printed pages and every printed page is in turn composed of pictures of merchandise, descriptions of merchandise, title and price particulars. It frequently occurs in practice that individual image or text originals are still outstanding in the production of the color separation data for the data source, so that the corresponding printed pages of the merchandising catalog cannot be assembled and the color separation data of these printed pages cannot be incorporated into the data set of the data source. It likewise occurs that printed pages of the merchandising catalog whose color separation data are present in the data set of the data source are up-dated by supplementary information, or that entire printed pages must be replaced by more current printed pages. A typical informational supplement, for example, is subsequent copying of current texts, titles, prices, etc. onto the background of a printed page.

Given such up-dating changes to and/or supplements of a printing order, it was previously necessary to repeat the electronic page montage with the modified or up-dated images and texts in order to transfer the new color separation data into the data set of the source and re-work the overall data set on the basis of a sorting run. Since the original of the current images of texts are usually film originals, but wherein electronic page montage functions with color separation data, i.e. film-free, the current originals must also then be converted into color separation data by optical scanning and digitization before the electronic page montage. This procedure is time-consuming and hardly justifiable in view of the required up-to-dateness in the printing industry.

SUMMARY OF THE INVENTION

It is therefore an object of the present invention to specify a method for recording printing forms and to specify a recording system in order to overcome these disadvantages. It is desirable that current changes and-/or supplementations of information on printed pages or entire printed pages of a printing order should be able to be carried out quickly with high precision and without time-consuming re-working of the color separation data already deposited in the data source, and thus directly in the printing form recording.

This object is achieved by acquiring at least two picture signal sequences each having picture signal values corresponding to picture elements. For each acquired picture signal sequence, a signal sequence is derived containing picture signal values for picture elements lying within at least one sub-area. For picture elements lying outside of the sub-area, picture signal values of the respective acquired signal sequences are replaced by a mask signal value. The at least two derived signal sequences are combined to form a resulting signal sequence formed of signal value combinations. A recording signal value is allocated to every possible picture signal value combination which may occur in the resulting signal sequence. During recording, the picture signal value combinations of the resulting signal sequence are employed to call in the respective allocated recording signal values to create a recording signal sequence for controlling a recording element for the printing form.

German patent No. 27 08 421, corresponding to U.S. Pat. Nos. 4,255,761 and 4,403,269, both incorporated herein by reference, already disclose a method for mixing analog picture signals in printing form recording with which, in particular, graduated or bleeding transitions at pictures which have been copied in are achieved. Directly in the printing form recording therein, the picture signals to be mixed are acquired by opto-electronic scanning of originals, and a mask signal controlling the picture mixing is acquired by additional opto-electronic scanning of a control mask. The signal mixing ensues by multiplication of the first picture signal to be mixed by the mask signal, by multiplication of the second picture signal to be mixed by the amplitude-converted mask signal, and by addition of the resulting signals to form the recording signal. This method is not suited for fast and precise modification and supplementation of current information on printed pages since a respective control mask must be prepared in a time-consuming job. As experience has taught, occasionally disturbing seams or edges at regions being copied cannot be avoided, even given precise mask production. German Patent No. 21 37 676, corresponding to U.S. Pat. No. 3,904,816, incorporated herein by reference, discloses a method for the reproduction of pictures wherein, before the printing form recording, picture signals are generated by opto-electronic scanning of originals, a mask signal is generated by opto-electronic scanning of a control mask, and the digitized signals are deposited in memories. During a work step which is likewise carried out before the printing form recording, the memories are then read out and the picture signals are computationally combined with the mask signal to form a combined recording signal which is again deposited in a memory up to the time of printing form recording. This method is likewise not suited for a fast and precise modification and/or supplementation of information directly in printing form recording without a corresponding modification of the data set. Furthermore, the production of a precise control mask is also required therein.

DESCRIPTION OF THE PREFERRED EMBODIMENTS

Figure 1:
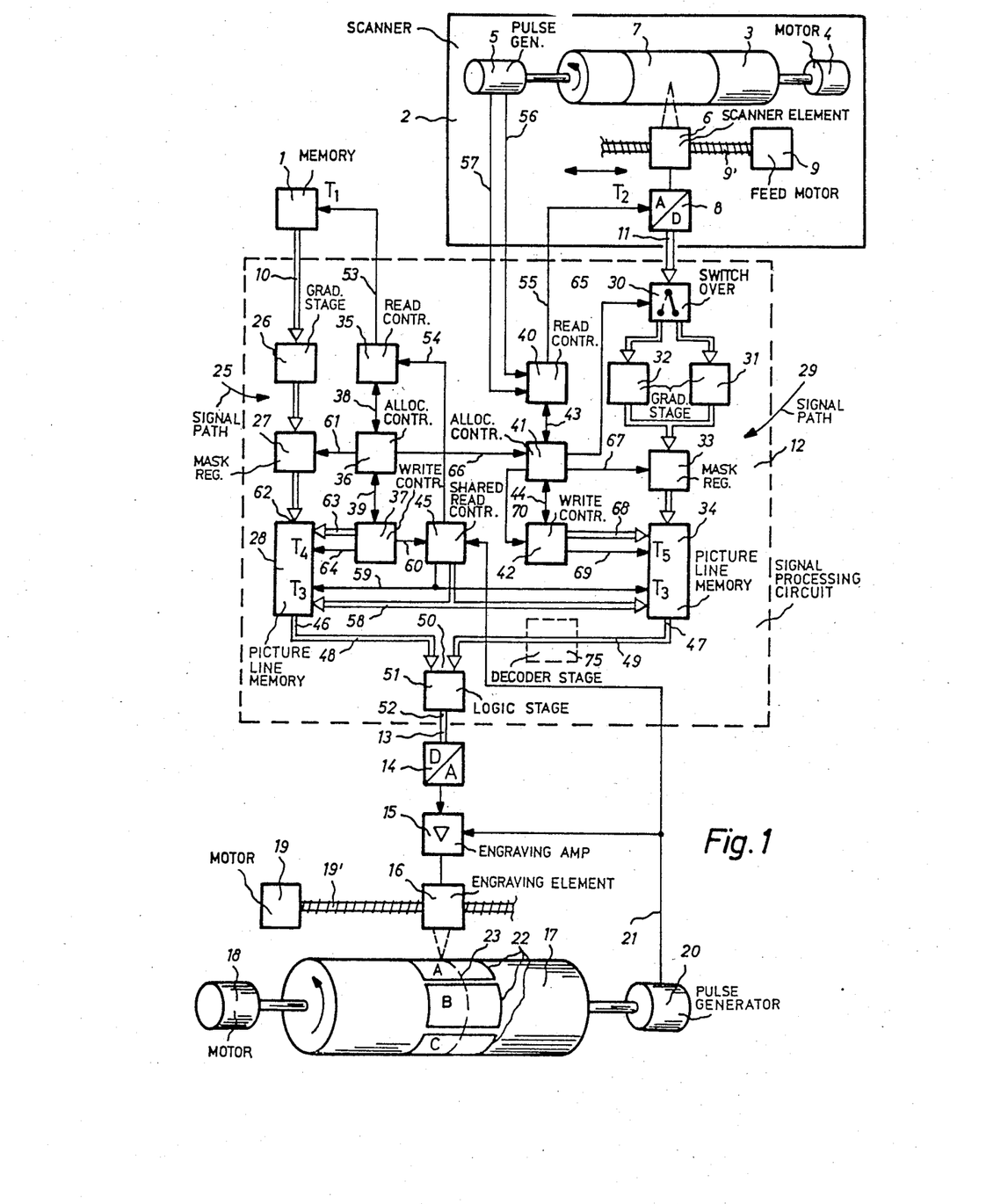
FIG. 1 is a block circuit diagram of an engraving system.

FIG. 1 shows the fundamental block circuit diagram of a recording facility for printing forms. In the illustrated example, the recording facility is the engraving unit or the separate engraving machine of an electronic engraving system for engraving rastered color separations on printing cylinders for rotogravure printing. However, the recording facility can also be an arbitrary recorder for point-by-point and line-by-line recording of printing forms on film material or for direct recording of printing forms.

The engraving unit is supplied from at least two data sources.

In the exemplary embodiment, the first data source is a memory means 1 (disk pack, magnetic tape, etc.) in which the color separation data of the individual color separations for the engraving of nearly all printed pages of a printing order are stored picture-element-by-picture-element and picture-line-by-picture-line, and may be readily called up.

In order to acquire the color separation data deposited in the memory means 1, a plurality of picture and text originals corresponding to the layout of the individual printed pages were first opto-electronically and trichromatically scanned in a color scanner and the color signals thereby acquired are converted into color separation signals by means of a color correction based on the laws of subtractive color mixing which apply in multi-color printing, and are subsequently converted into color separation data by means of an analog-to-digital conversion. The individual pictures and texts were then assembled to form entire printed pages based on the layout plans of the printed pages. They are assembled, for example, in an electronic picture processing system by combination of the color separation data, and the combined color separation data are deposited in the memory means 1 picture-element-by-picture-element and picture-line-by-picture-line.

Instead of the color separation data, picture data acquired by scanning black/white originals can also be deposited in the memory means 1, so that a general reference to picture data of the memory means 1 shall be made below. It is assumed such picture data has a respective word length of 8 bits, for example.

As explained in the introduction to the specification, the image data of individual printed pages can be lacking in the memory means 1, namely those printed pages for which the pictures and/or texts were not yet available at the time of picture data editing.

In the exemplary embodiment, the second data source is fashioned as a scanner 2 for black/white originals, or unrastered or rastered color separations. The scanner 2, for example, is the scan unit or the separate scan machine of the electronic engraving system.

This scanner 2 is composed of a scanning drum 3 which is driven by a motor 4, of a pulse generator 5 connected to the drum shaft, of an opto-electronic scanning element 6 for acquiring a picture signal on the basis of point-by-point and picture-line-by-picture-line scanning of an original arranged on the scanning drum 3, and of an analog-to-digital converter 8 connected to the scanning element 6 which digitizes the picture signal into picture data having, for example, a word length of 10 bits. With the assistance of a feed means composed of a feed motor 9 and of a spindle 9', the scanning element 6 is moved axially along the scanning drum 3 during the scanning of the original. At every revolution of the scanning drum 3, the pulse generator 5 generates a signal "scan begin" which marks the desired scan begin on the original 7.

The second data source, however, can also be a color scanner or a memory means in which the picture data acquired by opto-electronic scanning of an original and by digitization are intermediately stored.

In accordance with the invention, the scanner 2 supplies the current picture data which are not deposited in the memory means 1, these current picture data being taken into consideration in on-line fashion when the printing form is engraved.

In accordance with a reproduction job in printing form engraving set forth in the introduction to the specification, the scanner 2 supplies the current picture data of an entire printed pages which replace a printed page contained in the data set of the memory means 1 on the printing form or which are to be added instead of an empty page on the printing form. In this case, the original 7 scanned in the scanner 2 is a current printed page original comprising continuous tone and stroke or line information regions, and the one or the other data source participates in the engraving of the printing form alternating from printed page to printed page, this being referred to below as switch mode.

In accordance with another reproduction job, the scanner 2 supplies the current picture data of a stroke or line information, for example, lettering which is to be copied with the background of a printed page contained in the data set of the memory means. This lettering is then copied in on the printing form. In this case, the original 7 scanned in the scanner 2 is a stroke or line original and both data sources participate simultaneously in the engraving of the printing form at the point in time of copying-in, this being referred to below as the overlay mode.

The picture data sequences read out from the memory means 1 and from the scanner 2 are supplied via data buses 10 and 11 to a signal processing circuit 12 of the engraving unit in which a resultant recording data sequence is generated on a data bus 13 from the image data sequences.

The resultant recording data sequence is converted into an analog recording signal in a digital-to-analog converter 14 and is amplified in an engraving amplifier 15. In the engraving amplifier 15, the recording signal is overlaid by a raster or screen signal which determines the print raster or screen to be engraved. The engraving signal formed of the recording signal and raster or screen signal controls, for example, an electromagnetic engraving element 16 comprising an engraving chisel as a cutting tool. The engraving chisel engraves a sequence of small cups in a printing cylinder 17 arranged in the print raster or screen picture-line-by-picture-line. Whereas the raster or screen signal effects a vibrating stroke motion of the engraving chisel for producing the print raster or screen, the recording signal controls the penetration depth of the engraving chisel into the surface of the printing cylinder 17 and, thus, the depths of the small engraved cups or, respectively, the engraved tonal values between "black" and "white". The printing cylinder 17 is driven by a motor 18. The engraving element 16 is conducted axially past the printing cylinder 17 with the assistance of a feed means composed of a motor 19 and of a spindle 19'. A pulse generator 20 coupled to the shaft of the printing cylinder 17 generates a synchronizing signal on a line 21.

The rotational movements of the scanning drum 3 of the scanner 2 and of the printing cylinder 17 are synchronized with one another in a suitable way. When the scanner 2 is the integrated scan unit of the engraving system, scanning drum 3 and printing cylinder 17 are mechanically coupled by a shaft and one of the drive motors can be eliminated. When the scanner 2 is the integrated scan unit of the engraving system, scanning drum 3 and printing cylinder 17 are mechanically coupled by a shaft and one of the drive motors can be eliminated. When the scanner 2 is the separate scanning machine of the engraving system or is an arbitrary scanner, the synchronization of the rotational movements is achieved, for example, by frequency-controlled autoconverter drives for scanning drum 3 and printing cylinder 17. The electromagnetic engraving element 16 can also be a laser or electron beam generator modulated by the engraving signal.

Further details about the structure and functioning of such an engraving system can be derived from German patent No. 25 08 734, corresponding to U.S. Pat. No. 4,013,829, incorporated herein by reference.

For example, three printed pages 22, referenced A, B, and C are indicated on the printing cylinder 17, these to be successively engraved in the circumferential direction of the printing cylinder 17. Each engraved picture line 23 (circumferential line) is respectively composed of three sub-picture-lines of the individual printed pages 22.

A cylinder allocation pattern also referred to as a makeup pattern or cylinder layout which is produced by a reproduction technician determines the desired positions of the printed pages 22 relative to one another and on the printing cylinder 17.

In source allocation patterns for the memory means 1 and the scanner 2 likewise prepared by the reproduction technician, a mark is entered for every printed page whether this is to be recorded from the picture data of the memory means 1 or from the scanner 2 (switch mode) or, on the other hand, is to be recorded from the picture data of both data sources (overlay mode). For example, the printed page A is to be recorded from the picture data of the memory means 1, the printed page B is to be recorded from the current picture data of the scanner 2, and the printed page C is to be recorded from the picture data of both data sources, this being the case when, for example, a current lettering is to be copied into the background of the printed page C.

The assistance of these source allocation patterns is thus employed to determine which picture data are respectively valid as information to be recorded (valid picture data) and which picture data are to be left out of consideration (invalid picture data).

The structure of the signal processing circuit 12 as well as its function in the different reproduction jobs shall be set forth in greater detail below.

The signal path for the image data sequence from the memory means 1 is composed of a gradation stage 26 comprising a continuous tone gradation, of a mask register 27, and of a picture line memory means 28. The signal path 29 for the picture data sequence from the scanner 2 comprises an electronic switchover means 30, a gradation stage 31 comprising a continuous tone gradation, a further gradation stage 32 having a stroke gradation, a mask register 33, and a picture line memory means 34.

Every picture line memory means 28 or, respectively, 34 can store the engraving information for the cups of an entire picture line 23, whereby an engraving location in the picture line 23 on the printing cylinder 17 is allocated to every memory location. The picture line memory devices 28 and 34 are expediently fashioned as alternating memories each having at least two memory areas. The engraving information of the individual picture lines are thereby alternately written into the two memory areas and are also read out of the memory areas in alternate fashion. In this way, when writing the engraving information for a picture line into one of the memory areas, the engraving information of the preceding picture line can already be read out from the other memory area and be engraved, whereby the engraving time for the printing cylinder 17 is considerably reduced.

Also belonging to the signal control in the signal path 25 are a read controller 45 for the memory means 1, an allocation controller 36, and a write controller 37 for the picture line memory means 28. Read controller 35, allocation controller 36 and write controller 37 are synchronized with one another via lines 38 and 39. Likewise belonging to the signal path 29 are a read controller 40 for the scanner 20, an allocation controller 41, and a write controller 42 for the picture line memory means 34 which are synchronized with one another via the lines 43 and 44.

A shared read controller 45 for the picture line memory means 28 and 34 is also provided.

The data outputs 46 and 47 of the picture line memory means 28 and 34 are connected to the address input 50 of a logic or combining stage 51 via data buses 48 and 49. The data output 52 of the logic or combining stage 51 forms the output of the signal processing circuit 12 which is connected to the input of the digital-to-analog converter 14 via the data bus 13.

During the engraving of the printing cylinder 17, the picture data sequences are read-out and processed on-line from the memory means 1 and/or from the scanner 2 picture-element-by-picture-element and picture-line-by-picture-line.

For read-out of the memory means 1, the read controller 45 generates an engageable and disengageable read clock sequence $T_1$ which is supplied to the memory means 1 via a line 53. This read clock sequence $T_1$ is respectively shut off after the data of one picture line have been written into the picture line memory means 28, and is not switched on again for the write-in of the data of the following picture line until a memory area of the picture line memory means 28 can accept new data. This condition is communicated to the read controller 35 by the read controller 45 via a line 54.

For read-out of the scanner 2, the read controller 40 generates a further connectable and disconnectable read clock sequence $T_2$ which is supplied to the analog-to-digital converter 8 of the scanner 2 as a sample clock. It is supplied thereto via a line 55. The pulse generator 5 of the scanner 2 emits the signal "scan begin" at every revolution of the scanning drum 3 or, respectively, at the scan begin on every picture line of the original 7, this signal "scan begin" being forwarded via a line 56 to the read controller 40. Every signal "scan begin" initiates the read event for the picture data of a scanned image line in that the read clock sequence $T_2$ is started in the read controller 40 with the signal "scan begin". The read-out of the picture data from the scanner 2 is stopped at the end of every scanned picture line since the pulse generator 5 additionally emits a signal "scan end" at the desired picture line end, this signal "scan end" being supplied to the read controller 40 via a line 57 and interrupting the read clock sequence $T_2$ there.

The read-out of the picture data from the memory means 1, its processing, and the write-in of the processed data into the picture line memory means 28 ensues synchronously, as does the read-out of the picture data from the scanner 2, and the processing and the write-in into the picture line memory means 34. By contrast, the read events of the picture data from the memory means 1 and from the scanner 2 are not synchronized but are adapted to the requirements, whereby the two picture line memory means 28 and 34 simultaneously serve as data buffers. The read-out of the data of a picture line to be stored which are intermediately stored in the two picture line memory means 28 and 34 ensues synchronized with the raster or screen signal generation in the engraving amplifier 15 and with the rotational movement of the printing cylinder 17 or, respectively, with the engraving of the cups. For this purpose, the synchronizing signal formed in the pulse generator 20 is forwarded via the line 21 to the engraving amplifier 15 and to the shared read controller 45 for the picture line memory means 28 and 34.

The read controller 45 generates the common read addresses for both picture line memory means 29 and 34 on the address bus 58 and also generates a common read clock sequence $T_3$ on a line 59. The read clock sequence $T_3$ is respectively started when the respective data of an entire picture line are written into the picture line memory means 28. This condition is communicated to the read controller 45 via a line 60, and is communicated thereto from the write controller 37.

The detailed structure of the picture line memory means as well as the corresponding memory controller are set forth in detail in the aforementioned German Patent No. 25 08 734, corresponding to U.S. Pat. No. 4,013,829, incorporated herein by reference, so that a more detailed description can be omitted at this point.

The functioning of the signal processing circuit 12 is as described hereafter.

The picture data are read out from the memory means 1 with the assistance of the read clock sequence $T_1$. These picture data have a word length of eight bits and a value range of, for example 0 to 255, or a limited value range from 1 to 254. The data are modified in the gradation stage 26 based on a prescribed continuous tone gradation such that picture data likewise having a word length of 8 bits and having a value range of, for example, 1 (black) to 254 (white) appears at the output of the gradation stage 26. The value 255 is excluded due to the course of the continuous tone gradation, or is already excluded by the limited value range of the memory means 1. It is excluded for the reasons to be set forth later.

The modified picture data are successively intermediately stored in the mask register 27 picture datum by picture datum.

The source allocation pattern produced for the memory means 1 was previously programmed into the allocation controller 36, this source allocation pattern, as already set forth above, determining which picture data of the memory means 1 are valid as engraving information (valid picture data) and which are to remain out of consideration (invalid picture data or mask data).

In accordance with the source allocation pattern which has been programmed in, the allocation controller 36 always generates a mask signal on a line 61 when a picture datum intermediately stored in the mask register 27 is to apply as a picture datum which is invalid for engraving. In this case, the mask signal on the line 61 causes the corresponding picture datum to be replaced by a mask datum having a constant value of, for example, 255. In accordance with the invention, this value of the mask datum is selected such that it lies outside of the value range of the picture data containing the actual engraving information.

When, by contrast, a picture datum intermediately stored in the mask register 27 is a valid picture datum, the mask signal is suppressed and the picture datum is not influenced.

In the sequence defined by the memory means 1 and the corresponding source allocation pattern, picture data and mask data of a picture line are written into the picture line memory means 28 picture-element-by-picture-element via the data input 62. For this purpose, the write controller 37 generates the corresponding write addresses on an address bus 63 and generates a write clock sequence $T_4$ on a line 64.

The picture data read out from the scanner 2 first proceed onto the electronic switch-over means 30 which, as shall be set forth later, is switchable by the source allocation pattern of the scanner 2. For this purpose, the allocation controller 41 generates a corresponding control signal which is supplied to the electronic switch-over means 30 via a line 65.

The electronic switch-over means 30 is switched such that the picture data of the scanner 2 proceed to the gradation stage 31 comprising a continuous tone gradation given switch mode operation and proceed to the gradation stage 32 having a stroke gradation, given the overlay mode. When, by contrast, a mode alternating from printed page to printed page to be engraved is provided, the electronic switch-over means 30 is continuously switched. In this case, the switching is additionally controlled by the source allocation pattern of the memory means 1, for which purpose the allocation controller 41 receives a corresponding signal from the allocation controller 36 via a line 66.

Switch Mode

In switch mode operation, a printed page original having continuous tone and stroke regions is scanned in the scanner 2. The picture data having a word length of 10 bits proceed to the gradation stage 31 and are recoded there in accordance with the continuous tone picgradation into picture data having a word length of likewise 8 bits, and having a value range from one (black) through 254 (white), whereby the value 255 is again excluded as engraving information.

The source allocation pattern erected for the scanner 2 was likewise already programmed into the allocation controller 41. The modified picture data proceed to the mask register 33 in which, as already explained in the case of the mask register 27 of the signal path 25, picture data invalid for the scanner 2 in accordance with the source allocation pattern are replaced by mask data with the assistance of a mask signal on a line 67 and the valid picture data remain uninfluenced.

Picture data and mask data for every picture line of the scanned printed page are written in under those addresses of the picture line memory means 34 which correspond to the engraving position of the corresponding picture line or, respectively, printed page on the printing cylinder 17 as determined by the source allocation pattern of the scanner 2 or, respectively, by the cylinder allocation pattern.

For this purpose, the write controller 42 generates the corresponding write addresses on an address bus 68 and generates a write clock sequence $T_5$ on a line 69. For this purpose, the source allocation pattern of the scanner 2 additionally contains the specification regarding the required starting address for the picture data of the printed page in the picture line memory means 34, this being communicated to the write controller 42 from the allocation controller 41 via a line 70.

Overlay Mode

A stroke original having positive, negative, or mixed positive/negative stroke elements is scanned in the scanner 2 in the overlay mode and the picture data thereby acquired proceeds via the switched electronic switch-over means 30 to the gradation stage 32. In accordance with the scanned stroke original, the gradation stage 32 contains a stroke gradation for positive, for negative, or for mixed positive and negative stroke elements. The gradation stage 32, however, can also contain all three, different stroke gradations. In this case, the respectively required stroke gradation is selected on the basis of an instruction or, on the other hand, is also automatically selected on the basis of the source allocation pattern of the scanner 2 when different types of originals are simultaneously scanned in the scanner 2.

Figure 2A:
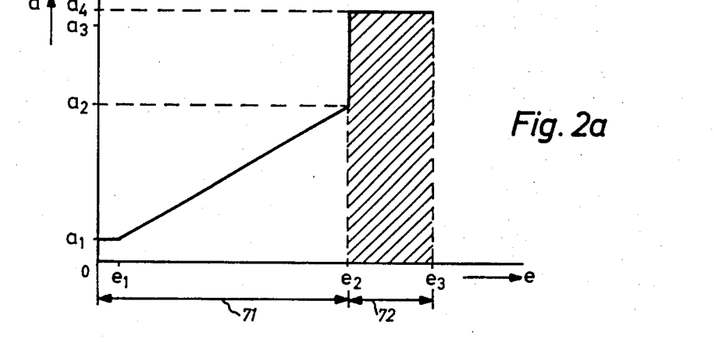
FIGS. 2a, b, c show curves of stroke graduations.
Figure 2B:
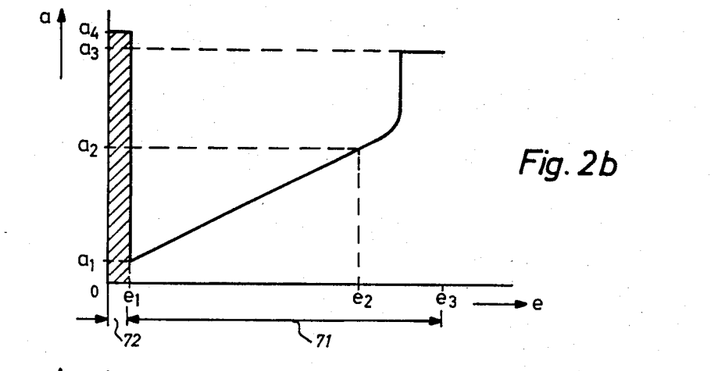
Figure 2C:
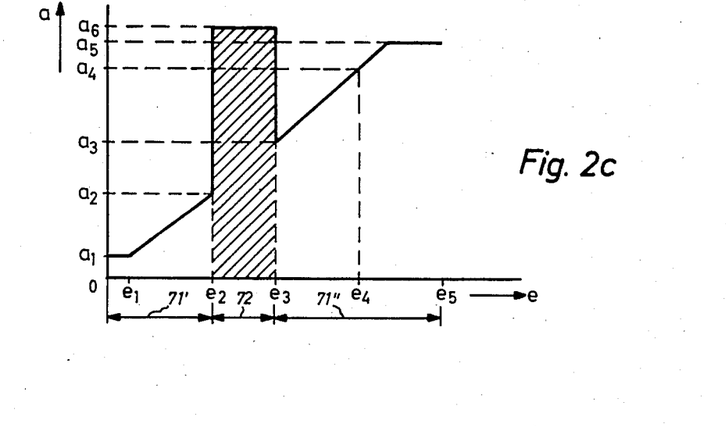

In accordance with the invention, the stroke gradation is fashioned such that an automatic masking of the stroke original ensues in the original scanning in the scanner 2 since specific density regions of the original are interpreted as information to be engraved (valid picture data) and other density regions are interpreted as mask (invalid picture data). For this purpose, the input value range and the output value range of the stroke gradation are each subdivided into an information range between "black" and "white", and into a mask range. Picture data of the scanned stroke original which fall into the information range at the input side are interpreted as valid picture data and, in accordance with the path of the gradation curve, are converted in terms of value into picture data of the information range at the output side. By contrast, all picture data of the scanned stroke original which fall into the mask range at the input side are interpreted as invalid picture data and are converted into the mask datum for the entire mask range at the output side. A recording of the picture data from 10 bits to 8 bits simultaneously ensues with the assistance of the stroke gradation. FIG. 2 shows curves of the stroke gradation of the invention for positive, negative, and mixed positive and negative stroke elements.

Whereas the source allocation patterns essentially control the generation of the mask data for entire printed pages, additional mask data for the scanned stroke original are automatically acquired with the assistance of the stroke gradations of the invention such that only the picture data of the stroke elements to be engraved are actually forwarded and the picture data of the ground of the original are suppressed.

The picture data and mask data output by the gradation stage 32 also traverse the mask register 33 and, as set forth, are written into the picture line memory means 34.

As a result of the synchronous read-out of the two picture line memory means 28 and 34, picture data and/or mask data of a picture element or, respectively, of a cup to be engraved appear simultaneously at the address input 50 of the logic or combining stage 51. The simultaneously arriving data are combined at the address input 50 to form an input address having a word length of 16 bits. For example, the data of the scanner 2 form the low-order bits $2^0$ through $2^7$ and the data of the memory means 1 form the high-order bits $2^8$ through $2^{15}$ of the input address.

In accordance with the invention, the mask datum of a picture element or cup respectively participating in the formation of an input address determines whether the engraving information for the corresponding cup is to be formed from the picture data of the one or of the other data source. When, by contrast, the input address does not comprise a mask datum, then the engraving information for the corresponding cup is formed from the picture data of both data sources.

The logic or combining stage 51 is constructed as a look-up table (LUT). The logic or combining stage 51 contains a recording datum having a word length of 8 bits for every possible combination of picture data and/or mask data at the address input 50 of the logic or combining stage 51 or, respectively, for every input address. This recording datum represents the desired engraving information for the corresponding cup.

For engraving a cup, a valid picture datum from the one data source and a mask datum from the other data source appears at the address input 50 of the logic or combining stage 51 as recording datum. The logic or combining stage 51 then supplies only the valid picture datum of the one data source, and the other data source does not participate in the engraving.

When the mask data of the one and of the other data source alternate from printed page to printed page to be engraved, the engraving system operates in switch mode, the logic or combining stage 51 has the function of a selective switch for engraving information and, during the engraving of the printing cylinders 17, printed pages are replaced by current printed pages, or current printed pages are supplemented on the printing cylinder 17. This functioning shall be set forth again schematically with reference to FIG. 3.

When one of the data sources is constantly supplied mask data during engraving, then the engraving unit is fed exclusively from the other data source.

Both data sources participate in the engraving of the printing cylinder 17 when the input address of the logic or combining stage 51 is formed only of valid picture data. The logic or combining stage 51 then outputs a recording datum which is formed either of the respectively valid picture data of both data sources having equal or unequal weighting or, on the other hand, has a freely selectable value. In this case, the engraving system operates in the overlay mode, the logic or combining stage 51 executes the function of a mixing or overlaying of engraving information, and, during engraving of the printing cylinder 17, a current lettering, for example, is engraved into the background of a printed page. This functioning shall be set forth again schematically with reference to FIG. 4.

As a result of the free allocation of recording data and input addresses in the logic or combining stage 51, the values of the recording data can be advantageously selected such that, for example, when copying lettering into a background, arbitrary progressions from the background to the lettering can be achieved in the contour region of the lettering. In particular, disturbing seams at the lettering that has been copied in can thus be avoided, this being shown in greater detail in FIG. 5.

In case both data sources simultaneously offer mask data, the logic or combination stage 51 does not supply any recording data and a blank page is "engraved" on the printing cylinder 17.

The operating modes of the logic or combination stage 51 during engraving of printing cylinders as set forth above shall again be compiled below in the form of a table.

| Data Source 1 Supplies | Data source 2 Supplies | Recording Datum From |
| --- | --- | --- |
| Picture Datum | Mask Datum | Data Source 1 |
| Mask Datum | Picture Datum | Data Source 2 |
| Picture Datum | Picture Datum | Data Source 1 and 2 |
| Mask Datum | Mask Datum | No recording data |

The invention is not limited to the exemplary embodiment of an engraving system which has been set forth.

Figure 6:
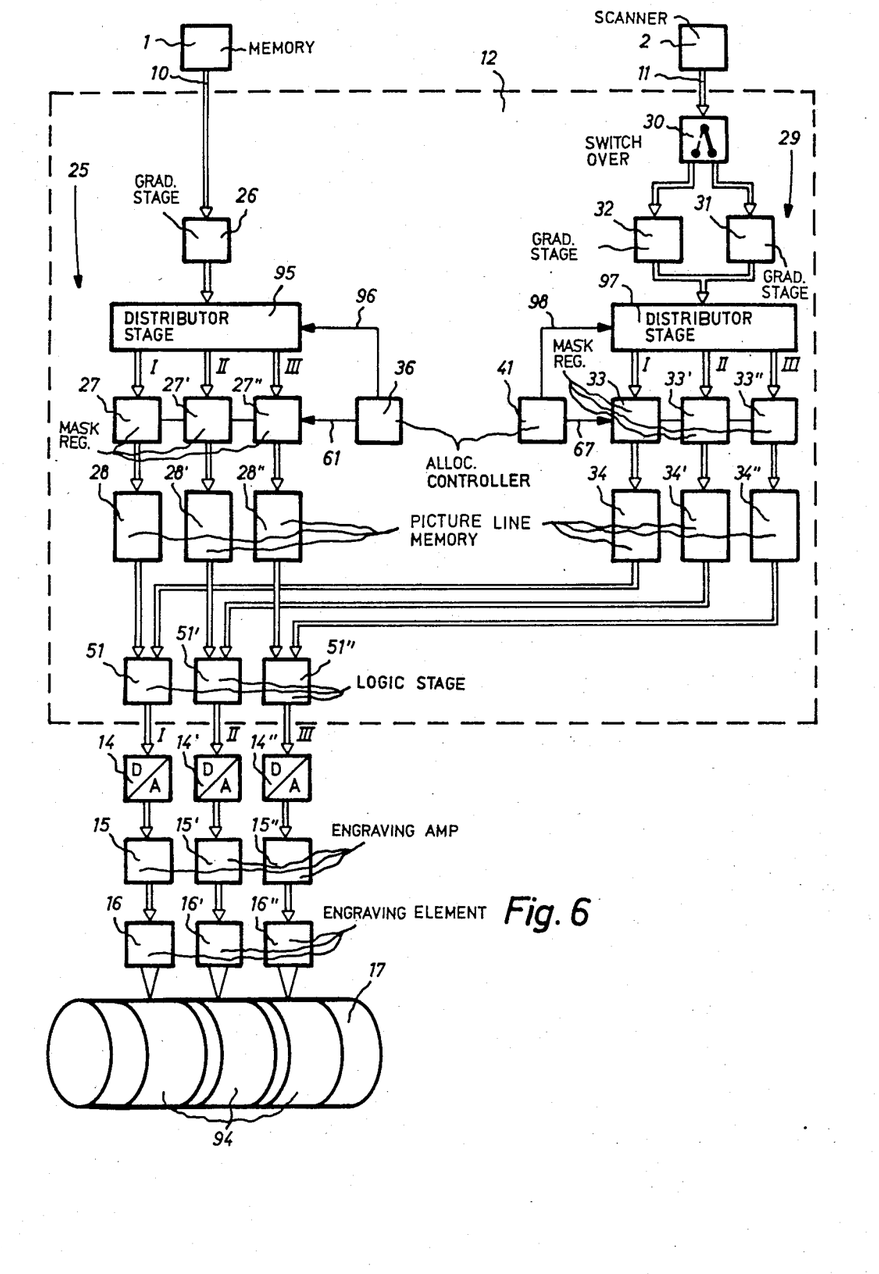
FIG. 6 is an engraving system for engraving a plurality of lanes.

A plurality of originals arranged following one another in the circumferential direction can be simultaneously scanned on the scanning drum 3 of the scanner 2 with the scanning element 6. The scanner 2 can also be equipped with a plurality of scanning elements, so that a plurality of originals arranged side-by-side on the scanning drum 3 in the axial direction can be simultaneously scanned. In this case, the scanner 2 comprises additional memory registers with which the image data of the individual scanning channels are read out from the scanner 2 in a multiplex mode and are supplied to the signal processing circuit 12. The automatic masking according to the invention of a scanned original on the basis of differing interpretation of the density values of the original with reference to stroke gradations can, of course, also be employed in and of itself outside of the engraving system. The illustrated engraving system functions with a single engraving element. For faster engraving of printing cylinders, it is standard practice to divide a printing cylinder into a plurality of sections (engraving lanes) and to simultaneously engrave the individual engraving lanes of a printing cylinder with a respective engraving element. In this case, too, the invention can be applied with great advantage. An engraving system comprising a plurality of engraving lanes is indicated in FIG. 6.

FIG. 2 shows the curves of the stroke gradations deposited in the gradation stage 32 of the engraving system of FIG. 1 for automatic masking of a stroke original scanned in the scanner 2.

FIG. 2a shows the specific gradation curve for stroke originals having positive stroke elements, whereby what is meant by positive stroke elements are black stroke elements (black lettering) on a light background.

The picture data formed by the scanner 2 are the input picture data e of the stroke gradation which are entered on the abscissa. The digitization of the picture signal acquired by the scanning elements 6 into input picture data e having a 10-bit resolution is carried out by the analog-to-digital converter 8. The input picture data e cover a value range from 0 through $e_3 = 1023$, which reproduces the density values measured in the stroke original. Scanning element 6 and the analog-to-digital converter 8 of the scanner 2 are calibrated such that an input picture datum of $e_1 = 16$ (black value) arises when scanning the calibration point "black" in the stroke original, and an input picture datum of $e_2 = 768$ (white value) arises when scanning the calibration point "white". When crossing the contour of a stroke element with the diaphragm of the scanning element 6, this element 6 "sees" gray scale values, and the input picture data assume values between $e_1 = 16$ and $e_2 = 768$ (gray range) in accordance with the respective black/white component in the diaphragm. This gray range, not required per se for recording purely black/white stroke elements, serves the purpose of improved reproduction of contours at stroke elements in rotogravure printing. When, by contrast, the lighter ground of the stroke original is scanned, the scanner 2 supplies picture data which are greater than $e_3 = 768$.

Determined by the stroke gradation, the input picture data e have output picture data e of 8 bits allocated to them within a value range from 0 through $a_4 = 255$, these being entered on the ordinate.

The value range of input picture data is subdivided into an information range 71 from 0 through $e_2 = 768$ and into a mask range 72 from $e_2 = 768$ through $e_3 = 1023$.

In accordance with the invention, input picture data which fall into the information range 71 at the input side are interpreted as engraving information (valid picture data) and input picture data which fall into the mask range 72 are interpreted as mask data (invalid picture data).

The conversion of the input picture data of the information range 71 ensues in accordance with the stroke gradation such that the output picture datum $a_1 = 1$ is formed when scanning the calibration point "black" and the output picture datum $a_2 = 161$ is formed when scanning the calibration point "white". A deep cup (black) is thereby engraved given the output picture datum $a_1 = 1$ and a light cup (white) is engraved given the output picture datum $a_2 = 161$. The relationship between input picture data and output picture data is determined by the course of the gradation curve between the calibration points, this being determined by the respective printing conditions.

In accordance with the specific path of the stroke gradation, input picture data which have a value greater than $e_2=768$ and which thus fall into the mask range 72 are converted into the mask datum $a_4=255$ at the output side, these data lying outside of the value range of the output picture data and thus not being interpreted as engraving information.

FIG. 2b shows the gradation curve for stroke originals having negative stroke elements, whereby what is to be understood by negative stroke elements are white stroke elements (white lettering) on a dark ground.

Given a stroke original comprising negative stroke elements as well, the input picture datum $e_1=16$ arises when scanning the calibration point "black", the input picture datum $e_2=768$ arises when scanning the calibration point "white", and input picture data which are greater than $e_2=768$ arise when scanning the white stroke elements. In this case, the value range of the input picture data e is subdivided into an information range 71 of $e_1=16$ through $e_3 32$ 1023 and into a mask range 72 of 0 through $e_1=16$ which lies outside of the information range 71.

In accordance with the invention, then, all density values of the stroke original which are greater than the density value of the calibration point "black" are interpreted as ground of the original and the stroke gradation converts the corresponding input picture data of the mask regions 72 into the mask datum $a_4=255$, whereas all input picture data falling into the information range 71, based on the path of the stroke gradation, are converted into valid picture data of the output value range of $a_1=1$ through $a_3=254$.

FIG. 2c shows the gradation curve for stroke originals having mixed positive/negative stroke elements.

In accordance with the invention, then, a middle density range of the stroke original between the density values of the calibration point "black" and of the calibration point "white" is interpreted as ground of the original. The mask range 72 thus lies within the original part of the information range 71 of the stroke gradations for positive or for negative stroke elements which is provided for better contour reproduction. As a result thereof, the value range at the input side is subdivided into a limited information sub-range 71' for positive stroke elements from 0 through $e_2=300$, into the mask range from $e_2 32$ 300 through $e_3=500$, and into a limited information sub-range 71'' for negative stroke elements from $e_3=500$ through $e_5=1023$. The density scope of the mask range 72 is defined such that all density fluctuations of the ground of the original fall into the mask range 72. Likewise, the available value range at the output side from $a_1=1$ through $a_5=254$ is subdivided into a first, limited sub-range from $a_1=1$ through $a_3=127$ for positive stroke elements and into a second, limited sub-range for negative stroke elements from $a_3=128$ through $a_5=254$. The sub-ranges can be equal or unequal.

Input picture data which fall into the information sub-range 71' from 0 through $e_2=300$ are interpreted as valid picture data for positive stroke elements, and the stroke gradation converts them into corresponding output picture data for positive stroke elements from $a_1=1$ through $a_2=80$. Input picture data which lie in the mask range 72 from $e_2=300$ through $e_3=500$ are recoded by the stroke gradation into the mask datum $a_6=255$. Input picture data which fall into the information sub-range 71'' from $e_3=300$ through $e_5=1023$ are converted by the stroke gradation into output picture data from $a_3=127$ through $a_5=254$.

Since, in the stroke gradation for mixed positive/negative stroke elements, the sub-range of the output picture data for positive stroke elements of $a_1=1$ through $a_3=127$ is limited in comparison to the original value range of $a_1=1$ through $a_3=254$, and the corresponding sub-range of the output picture data for negative stroke elements is likewise limited to $a_3=128$ through $a_5=254$ and is also additionally shifted, the limitation and the shift must in turn be cancelled before further processing of the picture data. For this purpose, a decoder stage 75 is provided in the engraving system of FIG. 1 between the picture line memory means 34 and the logic or combining stage 51, this decoder stage 75 being merely indicated with broken lines in FIG. 1 since it is effective only in the case of stroke gradation for mixed positive/negative stroke elements. The decoder stage 75 contains corresponding correction gradations which can also be programmed into the logic or combining stage 51. With the assistance of the correction gradation for positive stroke elements, for example, the picture datum $a_2 32$ 80 is re-coded into the original picture datum $a_2=161$ and the picture datum $a_3=127$ is recoded into the original picture datum $a_3=254$. With the assistance of the correction gradation for negative stroke elements, the picture datum $a_3=127$ is recoded into the original picture datum $a_1=1$ and the picture datum $a_4=207$ is recoded into the original picture datum $a_2=161$.

Of course, the values cited in the description of FIG. 2 are only examples to which the invention is not limited.

Figure 3:
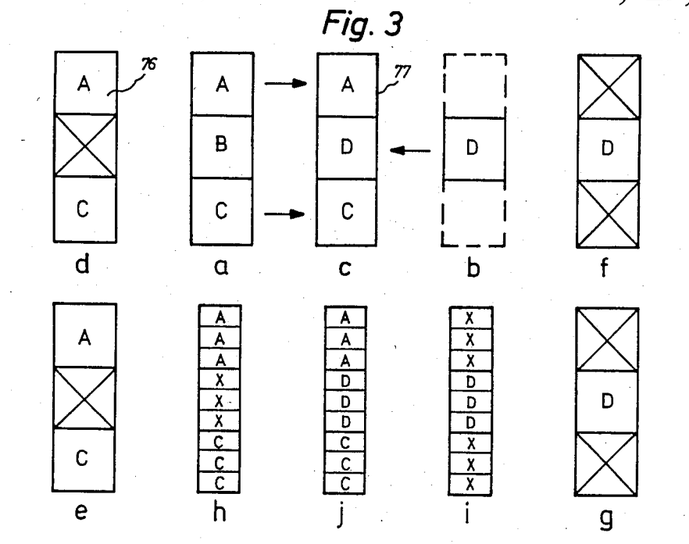
FIG. 3 illustrates a diagram for the switch mode of the engraving system.

FIG. 3 shows a diagram for the switch mode of the engraving system and this function shall be explained again with reference thereto.

Three printed pages A, B, and C lying in succession whose picture data are stored in the memory means 1 are shown in (a). (b) indicates a current printed page D whose picture data are acquired in the scanner 2 by scanning the corresponding printed page originals. In the engraving, the current printed page D should replace the printed page B contained in the data set of the memory means 1, so that the successively arranged printed pages A, D, and C are to be engraved on the recording surface 77 of the printing cylinder 17 as indicated in (c). The corresponding source allocation pattern for the memory means 1 which is deposited in the allocation controller 36 is shown in (d) or (e). The corresponding source allocation pattern for the scanner 2 which is programmed into the allocation controller 41 is recited in (f) or (g). Corresponding sub-areas 76 in the source allocation pattern are allocated to the printed pages. The letters in the sub-areas 76 are intended to indicate that the corresponding printed pages are to be engraved, whereas the crossed-out sub-areas 76 state that the corresponding printed pages are to be left out of consideration in the engraving. (h) shows a picture line formed of the valid picture data of the memory means 1 for the printed pages A and C and of mask data X, this picture line being deposited in the picture line memory means 28 of the engraving system. The illustration (j) shows a picture line composed of the valid picture data of the scanner 2 for the printed page D and likewise composed of mask data X, this picture line being intermediately stored in the picture line memory means 34. The sequence of picture data and mask data in every picture line is determined by the corresponding source allocation pattern, (e) or (g). Picture and mask data of both picture lines proceed to the logic or combining stage 51 of the engraving system. As already set forth, in switch mode, the logic or combining stage 51 only respectively forwards the valid picture data as recording data, so that the picture line illustrated in (j) is engraved on the printing cylinder 17.

Figure 4:
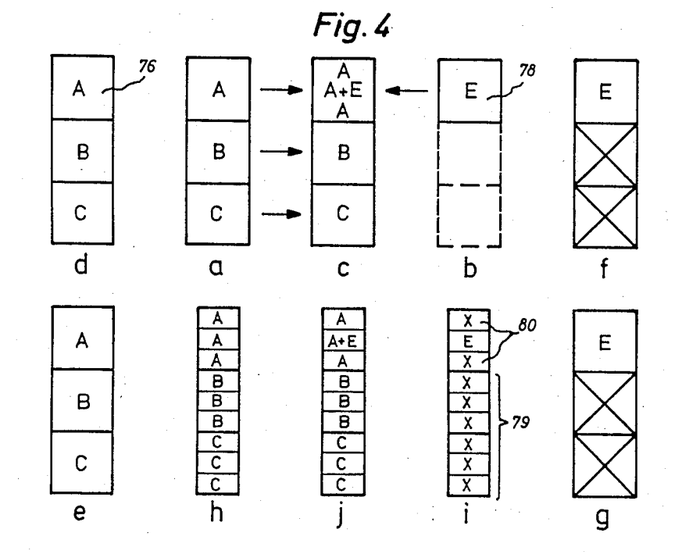
FIG. 4 is a diagram for the overlay mode of the engraving system.

FIG. 4 shows the corresponding pattern for the overlay mode of the engraving system. (a) again shows the printed pages A, B, and C lying in succession whose picture data are deposited in the memory means 1. (b) indicates a stroke original 78 having a current lettering E. The picture data of the stroke original 78 are acquired with the assistance of the scanner 2. During engraving, the current lettering E of the stroke original 78 which is not contained in the data set of the memory means 1 is to be copied into the background of the printed page A, whereas the printed pages B and C are to be engraved unmodified. The allocation of the printed pages A, B, and C to be engraved on the printing cylinder 17 is shown in (c), whereby "A" on the printed page A is intended to symbolize a pure background region and "A+B" is intended to symbolize an overlay region for background and lettering. The source allocation pattern for the memory means 1 is again shown in (d) or (e), and the corresponding source allocation pattern for the scanner 2 is shown in (f) or (g). (h) shows a picture line formed of the picture data A, B, and C of the printed pages A, B, and C deposited in the memory means 1, this picture line being intermediately stored in the picture line memory means 28. The illustration (i) shows a picture line formed of the picture data E for the lettering E of the stroke original 78 acquired from the scanner 2 and composed to mask data X, this picture line being deposited in the picture line memory means 34. The difference over the mask data generation in the switch mode set forth above is that only the mask data 79 are generated by the source allocation pattern of the scanner 2, whereas the mask data 80 within the stroke original 78 arise with the assistance of the stroke gradation of the invention. Finally, (j) also shows the corresponding, engraved picture line for the printed page arrangement according to (c).

FIG. 5 shows a graphic illustration for explaining the advantages of the free allocation of recording data to the input addresses of the logic or combining stage 51 given, for example, copying-in of stroke elements, particularly of lettering, into the background of a printed page. FIG. 5a shows a printed page 81 forming the background into which a stroke element 82 of a stroke original is to be copied. The line 83 indicates the direction of a picture line to be engraved, or indicates the engraving direction.

Figure 5A:
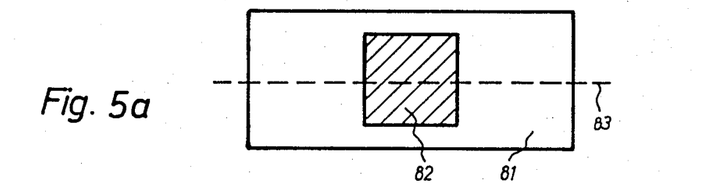
FIGS. 5a, b, c, d, e are graphic illustrations relating to in-copying.
Figure 5B:
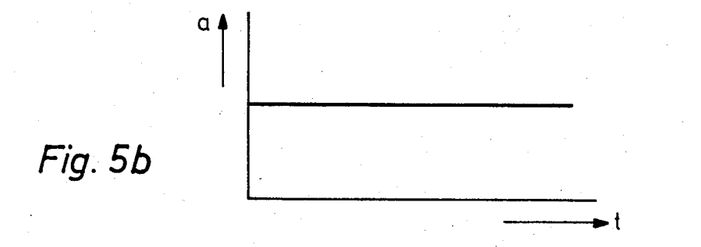
Figure 5C:
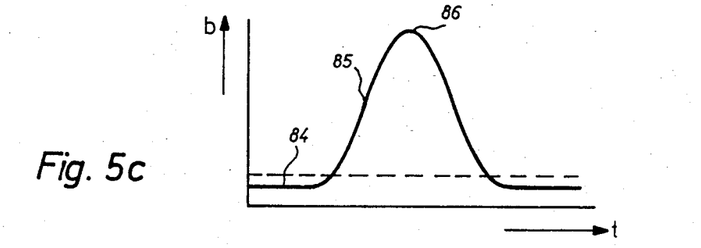
Figure 5D:
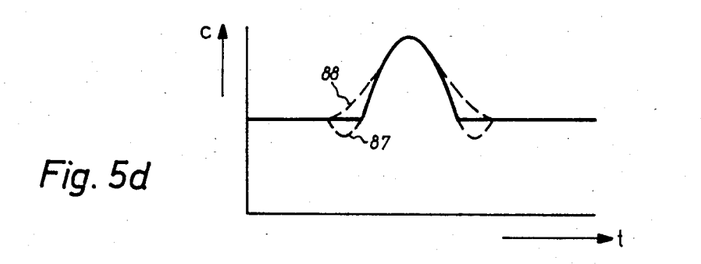
Figure 5E:
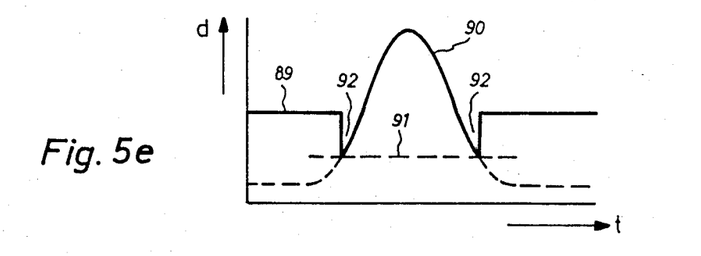

The diagram shown in FIG. 5b shows the curve of the picture signal values a supplied by the memory means 1 for the background of the printed page having constant density, entered over the picture line 83, or over the time t. The diagram in FIG. 5c shows the curve of the picture signal values b acquired by scanning the stroke original, and shows them over the corresponding picture line 83. The curve 84 derives when scanning the ground of the original, the curve 85 derives when scanning the contour of the stroke element 32, and the curve 86 derives when scanning the stroke element 82 itself. The broken line is intended to indicate the mask threshold of the stroke gradation, whereby, given picture signal values b lying below the mask threshold, the recording signal values c correspond to the picture signal values a and, given picture signal values b lying above the mask threshold, the recording signal values c are formed by a combination of the picture signal values a and b. The input addresses of the logic or combining stage 51 under which respectively allocated recording signal values c are deposited are formed by the picture signal values a and b of the memory means 1 and of the scanner 2. The allocation of recording signal values c and input addresses in the logic or combining stage 51 can thereby be undertaken such that every desired transition from background onto the stroke element and vice versa can be advantageously generated, whereby the reproduction quality is considerably enhanced. The diagram of FIG. 5d in which corresponding selected recording signal valves c are entered over the picture line 83 shows various possibilities for transitions at a stroke element 82. On the basis of the curve 87, for example, a lettering on a ground can be emphasized, whereby the curve 88 achieves softer transitions. In particular, disturbing seams at contours are advantageously avoided, these appearing given traditional in-copying with the assistance of control masks. As prior art, FIG. 5e shows the result given in-copying with a control mask which switches the picture signal 89 of the background and the picture signal 19 of a stroke element to be in-copied at a defined threshold 91. In this case, disturbing seams 92 arise at the contours of the stroke element that has been copied in.

FIG. 6 shows an improvement of the engraving system of FIG. 1 with which a plurality of engraving lanes or ribbons, three engraving lanes 94 in the illustrated example, can be simultaneously engraved on the printing cylinder 17. In this case, the engraving system comprises three separate engraving channels I, II, and III for the three engraving lanes 94. In comparison to the exemplary embodiment in FIG. 1, every signal path 25 or 29 is expanded by two mask registers 27' and 27" or 33' and 33", and by two picture line memory means 28' and 28" or 34' and 34" in accordance with the additional number of two more engraving lanes.

A mask register 27, 27' or 27" and a picture line memory means 28, 28' or 28" of the signal path 25 as well as the corresponding mask register 33, 33' or 33" and a corresponding picture line memory means 34, 34' or 34" of the signal path 29 is allocated to every engraving channel I, II, and III. Every engraving channel I, II, III further comprises a logic or combining stage 51, 51' or 51", a digital-to-analog converter 14, 14' or 14", an engraving amplifier 15, 15' or 15", and an engraving element 16, 16' or 16".

The source allocation patterns deposited in the allocation controllers 36 and 41 are expanded to the corresponding number of engraving lanes and additionally determine the engraving line or the engraving lines in which the printed pages are to be engraved.

The memory means 1 now contains the picture data for all engraving lanes. A distributor stage 95 is provided for distributing the picture data read out from the memory means 1 onto the engraving channels I, II, and III of the signal path 25, this distributor stage 95 being controlled by the allocation controller 36 via a line 96 dependent on the source allocation pattern deposited therein. A distributor stage 97 is likewise provided for the signal path 29, the picture data supplied from the scanner 2 being distributed onto the engraving channels I, II, and III therewith. The distributor stage 97 is switched by the allocation controller 41 dependent on the source allocation pattern stored there.

The method of the invention enables a universal operating mode of the engraving system in an advantageous way. During engraving, for example, printed pages in the selectable engraving lanes can be replaced by current printed pages, or can be supplemented by current printed pages, whereas lettering can be simultaneously copied into the printed pages in the same engraving lanes or in other, selected engraving lanes.

Although various minor changes and modifications might be proposed by those skilled in the art, it will be understood that I wish to include within the claims of the patent warranted hereon all such changes and modifications as reasonably come within my contribution to the art.

I claim as my invention:

1. A method for picture-element-by-picture-element and picture-line-by-picture-line recording of a printing form, a surface of the printing form being divided into sub-areas to be recorded, comprising steps of:
   acquiring at least two picture signal sequences each having picture signal values corresponding to picture elements;
   for each acquired picture signal sequence, deriving a signal sequence containing picture signal values for picture elements lying within at least one sub-area, and for picture elements lying outside of the sub-area, replacing picture signal values of the respective acquired signal sequence by a mask signal value;
   combining the at least two derived signal sequences to form a resulting signal sequence formed of combinations of the signal values to form signal value combinations;
   allocating a recording signal value to every possible picture signal value combination that may occur in the resulting signal sequence; and
   during recording, employing the picture signal value combinations of the resulting signal sequence to call in the respective allocated recording signal values to create a recording signal sequence for controlling a recording element for the printing form.

2. A method according to claim 1 wherein a value of the mask signal value lies outside of a desired value range of the picture signal values.

3. A method according to claim 1 wherein said sub-areas correspond to printed pages to be recorded.

4. A method according to claim 1 wherein at least one of the acquired picture signal sequences is stored and is read-out during the recording.

5. A method according to claim 1 wherein at least one of the acquired picture signal sequences is acquired by opto-electronic scanning of an original during recording.

6. A method according to claim 5 wherein the scanned original comprises a printed page which is to be supplemented during recording on the printing form.

7. A method according to claim 5 wherein the scanned original comprises a printed page which is to replace other printed pages.

8. A method according to claim 5 wherein the scanned original is a stroke original comprising stroke elements formed as lettering which is to be copied into printed pages during recording.

9. A method according to claim 1 wherein a signal value combination of the resulting signal sequence contains a picture signal value of a first of the derived signal sequences and a mask signal value of a second of the derived signal sequences; and the recording signal value allocated to the signal value combination derived from the picture signal value and mask signal value being dependent on the picture signal value of the first signal sequence, a picture signal value of the second picture signal sequence marked by the mask signal value being suppressed.

10. A method according to claim 9 wherein the allocated recording signal value corresponds to the picture signal value of the first derived signal sequence.

11. A method according to claim 1 wherein a signal value combination of the resulting signal sequence is composed of picture signal values of the at least two derived signal sequences; and the recording signal value allocated to this signal value combination is calculated from the picture signal values of both derived signal sequences with equal weighting.

12. A method according to claim 1 wherein a signal value combination of the resulting signal sequence is composed of picture signal values of the at least two derived signal sequences; and the recording signal value allocated to this signal value combination is calculated from the picture signal values of both derived signal sequences with unequal weighting.

13. A method according to claim 1 wherein a signal value combination of the resulting signal sequence is based on picture signal values of the at least two derived signal sequences such that the picture signal values of the derived signal sequences are compared to one another, and the recording signal value allocated to this signal value combination is formed from the picture signal value which is greater.

14. A method according to claim 1 wherein a signal value combination of the resulting signal sequence is based on picture signal values of the at least two derived signal sequences such that the picture signal values of the derived signal sequences are compared to one another, and the recording signal value allocated to this signal combination is formed from the picture signal value which is smaller.

15. A method according to claim 1 wherein a recording signal value to be allocated to a signal value combination of the resulting signal sequence is freely selectable at least within a prescribable value range.

16. A method according to claim 1 wherein the signal value combinations of the resulting signal sequence form input addresses of a memory under which the allocated recording signal values are stored in callable fashion.

17. A method according to claim 1 wherein one of the acquired picture signal sequences is acquired by opto-electronic scanning of at least one stroke original, picture signal values thereof being a measure for density values of the scanned stroke original, the stroke original corresponding to a sub-area to be recorded; and in order to derive a signal sequence picture signal values of the one acquired picture signal sequence which lie within the sub-area being additionally replaced by a mask signal value when they lie within a given density range of the stroke original so that a mask region is defined.

18. A method according to claim 17 wherein said defined mask region encompasses density values of a ground of the original, picture signal values reproducing stroke elements being recorded and picture signal values reproducing the ground of the original being suppressed.

19. A method according to claim 18 wherein the stroke elements in the stroke original comprise higher density values than the ground of the original, and wherein the mask region encompasses all density values of the stroke original which are lower than the density value of a calibration point for "white" of the original.

20. A method according to claim 18 wherein the stroke elements comprise lower density values than the ground of the original, and the mask region encompasses all density values of the stroke original which are greater than the density value of a calibration point for "black" of the original.

21. A method according to claim 18 wherein the stroke elements comprise lower and higher density values than the ground of the original, the mask region being placed between the density values of calibration points for "white" and "black" of the original.

22. A method according to claim 17 wherein a density range of the mask region is selected at least as great as a maximum density difference in a ground of the original.

23. A method according to claim 17 wherein the one acquired picture signal sequence is employed for creating the signal sequence with assistance of a gradation curve which additionally converts picture signal values of the picture signal sequence falling into the mask region into the mask signal value and which modifies picture signal values lying outside of the mask region in accordance with the gradation curve.

24. A method according to claim 1 wherein the signal sequences are intermediately stored picture-line-by-picture-line.

25. A method for picture-element-by-picture-element and picture-line-by-picture-line recording of a printing form, comprising steps of:
acquiring a picture signal sequence by opto-electronic scanning of a stroke original having stroke elements, said picture signal sequence having picture signal values which are a measure for density values of the scanned stroke original;
from the acquired picture signal sequence, deriving a signal sequence which contains picture signal values of the acquired picture signal sequence when said picture signal values represent density values of stroke elements to be recorded, and which contains a mask signal value which replaces the picture signal values when such picture signal values represent a prescribable density range of a ground of the original which is not to be recorded and thus defining a mask region, a value of the mask signal value lying outside of a desired value range for the picture signal values;
allocating to every picture signal value which can occur in the derived signal sequence a recording signal value based on the picture signal value allocated to it, and allocating to the mask signal value an independent recording signal value; and
during recording, employing the picture signal values of the derived signal sequence to call in the allocated recording signal values so as to create a recording signal sequence for controlling a recording element for the printing form.

26. A system for picture-element-by-picture-element and picture-line-by-picture-line recording of a printing form, a surface of the printing form being divided into sub-areas to be recorded, comprising:
means for acquiring at least two picture signal sequences each having picture signal values corresponding to picture elements;
means for deriving for each acquired picture signal sequence a signal sequence containing picture signal values for picture elements lying within at least one sub-area, and for picture elements lying outside of the sub-area, for replacing picture signal values of the respective acquired signal sequence by a mask signal value;
means for combining the at least two derived signal sequences to form a resulting signal sequence formed of combinations of the signal values to form signal value combinations;
means for allocating a recording signal value to every picture signal value combination that may occur in the resulting signal sequence; and
means for employing during recording the picture signal value combinations of the resulting signal sequence to call in respective allocated recording signal values to create a recording signal sequence for controlling a recording element for the printing form.

27. A system for picture-element-by-picture-element and picture-line-by-picture-line recording of a printing form, comprising:
means for acquiring a picture signal sequence by opto-electronic scanning of a stroke original having stroke elements, said picture signal sequence having picture signal values which are a measure for density values of the scanned stroke original;
means for deriving from the acquired picture signal sequence, a signal sequence which contains picture signal values of the acquired picture signal sequence when said picture signal values represent density values of stroke elements to be recorded, and which contains a mask signal value which replaces the picture signal values when such picture signal values represent a prescribable density range of a ground of the original which is not to be recorded, thus defining a mask region, a value of the mask signal value lying outside of a desired value range for the picture signal values;
means for allocating to every picture signal value which can occur in the derived signal sequence with a recording signal value dependent on the picture signal value allocated to it, and for allocating to the mask signal value an independent recording signal value; and
means for employing during recording the picture signal values of the derived signal sequence to call in the allocated recording signal values so as to create a recording signal sequence for controlling a recording element for the printing form.

28. A system for picture-element-by-picture-element and picture-line-by-picture-line recording of printing forms, comprising:
at least first and second signal source means for respective acquisition of first and second picture signal sequences;
first and second controller means respectively connected to the first and second signal source means for calling in the respective picture signal sequences from the first and second signal source means;
first and second gradation stages respectively connected to the first and second signal source means;

a signal processing means connected to the first and second gradation stages for formation of a recording signal sequence;

a printing form recording element connected to the signal processing means; and said signal processing means including first and second mask stage means respectively connected to the first and second gradation stages for formation of signal sequences with signal value combinations from the picture signal sequences, first and second allocation controller means respectively connected to the first and second mask stage means for control of the respective mask stage means for generation of said signal value combinations, and combining stage means connected to the first and second mask stage means for allocation of recording signal values to said signal value combinations of the signal sequences.

29. A system according to claim 28 wherein the first signal source means comprises a memory means for the acquisition of the first picture signal sequence and the second signal source means is a scanner means for the acquisition of the second picture signal sequence by opto-electronic scanning of an original.

30. A system according to claim 28 wherein a gradation stage means for density values of the scanned original is connected between the scanner means and the second mask stage means allocated to said scanner means.

31. A system according to claim 28 wherein the combining stage means comprises an addressable table memory for recording signal values.

32. A system according to claim 28 wherein first and second picture line memory means are respectively connected between the first and second mask stage means and the combining stage means for picture-line-by-picture-line intermediate storage of signal values.

33. A system according to claim 28 wherein the printing form recording element comprises an engraving unit.

* * * * *